US012469505B2

(12) United States Patent
Woodruff et al.

(10) Patent No.: US 12,469,505 B2
(45) Date of Patent: Nov. 11, 2025

(54) USE OF STEGANOGRAPHIC INFORMATION AS BASIS TO PROCESS A VOICE COMMAND

(71) Applicant: The Nielsen Company (US), LLC, New York, NY (US)

(72) Inventors: Stanley Wellington Woodruff, Palm Harbor, FL (US); John Thomas LiVoti, Clearwater, FL (US)

(73) Assignee: The Nielsen Company (US), LLC, New York, NY (US)

( * ) Notice: Subject to any disclaimer, the term of this patent is extended or adjusted under 35 U.S.C. 154(b) by 300 days.

(21) Appl. No.: 18/168,859

(22) Filed: Feb. 14, 2023

(65) Prior Publication Data
US 2024/0274140 A1 Aug. 15, 2024

(51) Int. Cl.
*G10L 15/22* (2006.01)
*G10L 19/018* (2013.01)

(52) U.S. Cl.
CPC ............ *G10L 19/018* (2013.01); *G10L 15/22* (2013.01); *G10L 2015/223* (2013.01)

(58) Field of Classification Search
CPC ......... G10L 15/22; G10L 15/08; G10L 25/03; G06F 3/167
See application file for complete search history.

(56) References Cited

U.S. PATENT DOCUMENTS

| | | | | |
|---|---|---|---|---|
| 10,503,468 B2* | 12/2019 | Thangarathnam | ....... | G06F 40/30 |
| 11,244,674 B2* | 2/2022 | Garcia | ..................... | G10L 15/20 |
| 11,315,563 B2* | 4/2022 | Jones | ....................... | G06F 3/165 |
| 11,321,756 B1* | 5/2022 | Schaaf | ............... | G06Q 30/0623 |
| 11,429,344 B1* | 8/2022 | Fernandez | ............... | H04L 12/12 |
| 11,600,270 B2* | 3/2023 | Yamagishi | ............ | G10L 19/018 |
| 2020/0211549 A1* | 7/2020 | Yamagishi | .............. | G10L 25/51 |
| 2022/0301549 A1* | 9/2022 | Lee | .......................... | G10L 15/08 |

* cited by examiner

*Primary Examiner* — Daniel Abebe
(74) *Attorney, Agent, or Firm* — McDonnell Boehnen Hulbert & Berghoff LLP

(57) ABSTRACT

A method and system for voice-command processing based on steganographically encoded information. In an example method, a computing system receives a voice command spoken by a user, and the computing system also extracts information from steganographic encoding in an environment of the user. The computing system then uses the information extracted from the steganographic encoding in the environment of the user as a basis for the computing system to process the received voice command spoken by the user. Further, the computing system takes action based on the processing of the voice command.

18 Claims, 3 Drawing Sheets

USE OF STEGANOGRAPHIC INFORMATION AS BASIS TO PROCESS A VOICE COMMAND

SUMMARY

Advances in processing power and speech recognition technology have made voice-based interaction between humans and machines increasingly accessible. A representative voice-response system may include a voice user interface (VUI) that enables a user to interact with the system by voice, with the VUI being configured to receive spoken voice commands from the user and, in some cases, to provide voice responses (e.g., machine-generated speech) to the user. More particularly, the system may apply speech recognition to translate a user's spoken voice commands to text or other data representations, and the system may respond to those voice commands by carrying out associated actions. Further, the system may provide voice or other feedback as a response to the user who spoke the command. As used herein, the term "voice command" may refer to a spoken command to take some action or may refer to other speech that results in taking of action.

Allowing a user to interact with a system through voice may optimally enable hands-free and eyes-free interaction, possibly freeing the user from the need to touch or even look at an associated device. For instance, a VUI associated with a voice-capable device may be configured to detect user utterance of a wakeup command such as "Hey Device!" and, upon detecting utterance of the wakeup command, to then monitor for user utterance of a command such as "Tell me the weather" or "Turn down the lights" and to respond accordingly, without a need for the user to touch or look at the device. Alternatively, some implementations may involve user touch or other input to facilitate voice interaction, such as the user pressing a button to put the device in a voice recognition mode and then speaking a voice command to trigger responsive action.

A representative voice-response system may make use of advanced artificial intelligence (AI) technology to recognize speech, such as by parsing a user's voice command and analyzing associated speech components to determine the user's intent, in order to trigger an appropriate response.

Further, the voice-response system may be distributed between a voice-capable device located nearby the user and a cloud-based computing system that may be optimized for handling more processor-intensive tasks. For instance, the nearby device may be equipped with a microphone for receiving acoustic audio that may include voice commands and a sound speaker for outputting acoustic audio possibly also including voice. When the nearby device receives through its microphone a voice command spoken by the user, the device may transmit that voice command or a representation of that voice command to the cloud-based computing system, and the cloud-based computing system may then perform speech recognition and trigger an appropriate response possibly through interaction with the device and/or with one or more other devices. Alternatively, the voice-response system may be provided wholly within the nearby device, among other possibilities.

Numerous examples of such voice-capable devices are possible. Without limitation, examples include mobile phones, tablets, personal computers, smart speakers, smart televisions, wearable devices such as headphones, smart watches, and augmented reality devices, vehicles, Internet of Things (IoT) devices such as lights, thermostats, and power systems, as well as other devices that may include embedded or other voice-capability.

In some situations, a user may speak a voice command to control a device or system in the user's environment, such as to control the lights or temperature in the room where the user is positioned, or to control media presentation by a television or other device.

For instance, when a user is in a family room having IoT-based lights, the user may speak into a voice-capable IoT controller (e.g., one of the devices noted above) a command such as "Hey Device—turn down the family room lights." When the user speaks the command "Hey Device", the voice-capable IoT controller may wake up from a sleep mode if applicable and may then process the user's voice command to "turn down the family room lights". In response, the IoT controller may then interwork with a cloud-based computing system to facilitate speech recognition, such as parsing of the voice command and determining the user intent to turn down the lights in the family room. Upon determining this user intent, the cloud-based computing system and/or the IoT controller may then engage in control signaling with the IoT-based lights in the family room, to cause the light level to be lowered per the user's voice command.

Likewise, when a user is in a room having a voice-capable thermostat for controlling temperature in the room, the user may speak into the thermostat a command such as "Hey Thermostat-increase temperature by 2 degrees." When the user speaks the command "Hey Thermostat", the voice-capable thermostat may wake up from a sleep mode if applicable and may then process the user's voice command to "increase temperature by 2 degrees". In response, the thermostat may interwork with a cloud-based computing system to facilitate speech recognition to determine the user intent to increase the temperature by 2 degrees. Upon determining this intent, the thermostat may then responsively increase a temperature set point for the room by 2 degrees, which may have the effect of causing temperature in the room to increase by that amount.

Similarly, when a user is watching television, the user may press a voice-command button on an associated remote control and speak a command such as "Go to channel 187." This voice command may then pass from the remote control to an associated media player (e.g., the television or a connected device), and the media player and/or a cloud-based computing system may perform speech recognition to determine the user intent to change the television to channel 187. In response, the media player may therefore change to channel 187, resulting in presentation of that requested channel on the television.

In addition, in some situations, a user may speak a voice command to trigger action related to the context or subject matter of something in the user's environment.

By way of example, a user may speak a voice command to trigger action related to the subject matter of media content that is currently playing in the user's environment, such as to trigger a commercial transaction related to the subject matter, or to obtain information about the subject matter.

For instance, when a user is watching television and sees a commercial or in-program presentation of a specific product or service, the user may speak a voice command to add that product or service to an online shopping list maintained for the user, or to purchase the product or service and/or to take some other action with respect to the product or service. For example, if the user is watching television and sees a commercial for a XYZ Breakfast Cereal or an in-program placement of XYZ Breakfast Cereal, the user may speak a voice command such as "Hey Device!—put XYZ Breakfast Cereal on my shopping list," and a voice-response system may receive that command, perform speech recognition to determine the user intent, and responsively add XYZ Breakfast Cereal to the user's shopping list. Alternatively, if the user is watching television and sees such a commercial or in-program product placement, the user may speak a voice command such as "Hey Device!—order XYZ Breakfast Cereal," and a voice-response system may receive that command, perform speech recognition to determine the user intent, and responsively place an order on behalf of the user (e.g., using pre-stored user payment credentials and shipment/delivery information) for XYZ Breakfast Cereal.

Likewise, if the user is watching television and sees a particular actor portraying a character in a movie or television show, the user may speak a voice command to get information about the actor. By way of example, if the user is watching a movie and sees actor Ernest Borgnine playing a role, the user may speak the voice command "Hey Device!—how many movies was Ernest Borgnine in?" Given this voice command, a voice-response system may then perform speech recognition to determine the user intent and may responsively look up to determine that Ernest Borgnine was in at least 64 movies, and the voice-response system may therefore respond to the user with machine-generated voice stating "Ernest Borgnine was in at least 64 movies".

As another example, if a user is visiting a museum and sees a piece of art that the user would like to know more about, the user may speak a voice command to request more information about that piece of art. For instance, if the user sees a painting labeled "XYZ Painting," the user may speak the voice command "Hey Device!—tell me the history of XYZ Painting." Given this voice command, a voice-response system may then perform speech recognition to determine the user intent and may responsively look up to determine the history of "XYZ Painting" and may respond to the user providing the requested information.

One technical issue with having a user speak a voice command related to the context or subject matter of something in the user's environment is that doing so may rely on the user specifically identifying that subject matter and stating that subject matter as part of the user's voice command.

For instance, with the breakfast-cereal example above, in order for the user to have the system add XYZ Breakfast Cereal to the user's shopping list or order XYZ Breakfast Cereal on behalf of the user, the user would need to speak that particular brand and item, namely, "XYZ Breakfast Cereal" or "XYZ Cereal," as part of the user's voice command, to enable the voice-response system to determine that the user intent is to add or order that specific item, as opposed to some other item. Likewise, with the actor example above, in order for the user to request information about Ernest Borgnine, the user would need to speak the name "Ernest Borgnine" as part of the user's voice command, to enable the voice-response system to determine that the user intent is to get information about that specific actor, as opposed to some other actor. And with the art museum example above, in order for the user to request information about the history of "XYZ Painting," the user would need to speak that particular painting name, namely, "XYZ Painting," as part of the user's voice command, to enable the voice-response system to determine that the user intent is to get information about that particular painting, as opposed to some other painting.

The present disclosure provides a mechanism that may help address this technical issue. The disclosed mechanism will make use of steganographically encoded information in the user's environment as a basis to process the user's voice command. Namely, the disclosed mechanism may involve obtaining information from steganographic encoding in the user's environment and using that obtained information as a basis to enhance (e.g., supplement, tailor, clarify, etc.) the user's voice command, so as to facilitate responding to the voice command. This process may therefore help avoid the need for the user to speak the subject matter directly or clearly, as a system carrying out this process may ascertain the subject matter at issue from the steganographic encoding in the user's environment and may then use that ascertained subject matter as a basis to process the user's voice command.

These as well as other aspects, advantages, and alternatives, will become apparent to those of ordinary skill in the art by reading the following detailed description, with reference where appropriate to the accompanying drawings. Further, it should be understood that the disclosure provided in this summary elsewhere in this document is provided by way of example only and that numerous variations and other examples may be possible as well.

DETAILED DESCRIPTION

Figure 1:
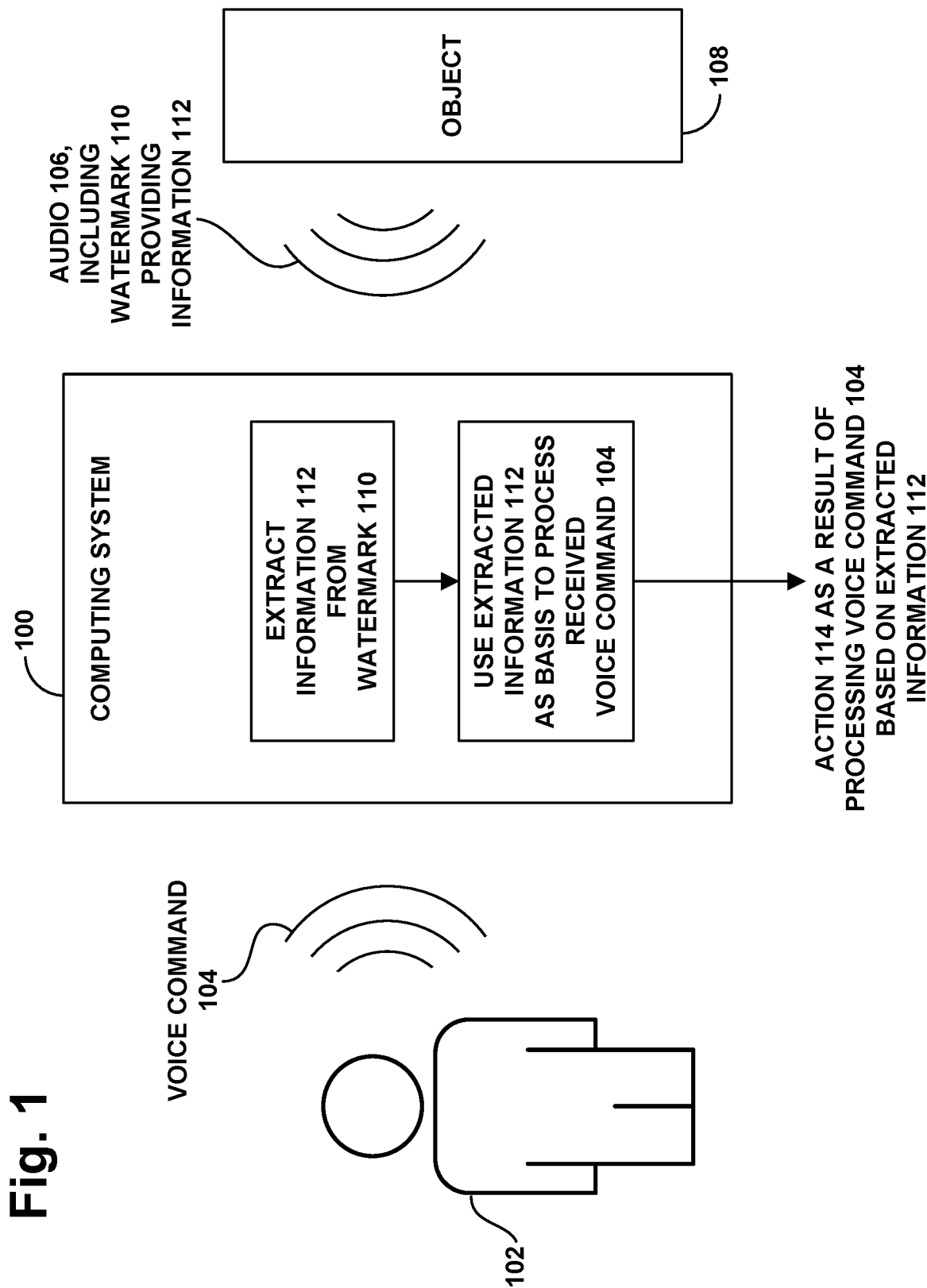
FIG. 1 is simplified block diagram illustrating how steganographic information in a user's environment could be used as basis to facilitate processing of a voice command spoken by the user.

Steganography is understood to be a process of representing information in an object or message in a manner such that the presence of the information is generally not evident to a human upon inspection of the object or message.

An example of steganography in relation to media content is watermarking, where information is encoded within the media content in a manner that is generally imperceptible or not evident to a person watching or listening to the media content but that a computing system may be able to detect and read. For instance, watermarking could be done within an audio stream by encoding information in an audio frequency range that is outside the range of normal human hearing but that a computing system could detect and extract through use of suitable signal processing. Alternatively, watermarking could be done within image data (e.g., within one or more video frames) by encoding information through subtle manipulation of image data or the like in a manner that a human observer would not understand but that a computing system may likewise be able to detect and thus extract through suitable signal processing. The information so steganographically encoded may also be encrypted. Further, other forms of steganography are also possible, including but not limited to optical steganography, text steganography, and others.

In accordance with the present disclosure, at or around the time a computing system (e.g., a voice-response system)

receives a voice command spoken by a user, the computing system will also extract steganographically encoded information from the user's environment and will use that extracted information as a basis to process the received voice command, in order to facilitate responding to the voice command. For instance, the computing system may use the extracted information as a basis to determine user intent of the voice command, perhaps to supplement or clarify the voice command, among other possibilities, so that the computing system can respond accordingly.

In an example implementation, as to voice commands related to the subject matter of media content such as but not limited to television, radio, or podcast content, this process can take advantage of audio watermarks that are included in the media content for this or other purposes in the media content.

By way of example, the process can take advantage of watermarks that are included in the media content to facilitate audience measurement.

For instance, a provider (e.g., content creator, promoter, distributor, etc.) of the media content may embed in the media content audio watermarks that expressly or by reference provide information about the media content or about particular portions or other aspects of the media content. An audience-measurement provider, such as The Nielsen Company (US), LLC, may then equip users, households, or the like, with monitoring devices configured to monitor audio in search of the presence of such audio watermarks and to respond to detecting such watermarks by recording and/or reporting to an audience-measurement system an indication of audience exposure to the watermarked media content.

As to a media stream that includes an advertisement for a product or service (e.g., in a commercial break, or implicitly through in-program product/service placement), for instance, the content provider may embed in the media stream, at or around the time of the advertisement, audio watermarking (e.g., one or more audio watermarks) that encodes data that expressly or by reference provides information about the product or service, such as an advertisement identifier and/or the product/service name, among other possibilities. For example, such a watermark may comprise a codeword that has a database relationship with this information or may expressly specify this information. Further, the watermark may have a particular structure, timing, and/or other characteristic that enables a user's monitoring device to detect and read the watermark. As a user's monitoring device monitors audio in the user's environment and detects this audio watermark, the device may then read, record, and report the encoded data as an indication that the user has been exposed to that particular advertisement. This reported data may then help to facilitate setting advertisement prices, planning rates of advertising impressions, and/or the like.

In an example implementation, the present process can take advantage of such watermarking to facilitate processing a user's voice command that relates to a product or service that is the subject of such an advertisement.

For instance, when a user is watching or listening to a media stream that includes an advertisement as well as associated audio-watermarking, the user may speak the voice command "Hey Device!—add this product to my shopping list." A voice-response system may thus receive the user's voice command to "add this product to my shopping list" and may perform speech recognition, parsing the user's voice command and determining the user intent to add "this product" to the user's shopping list. At issue for the voice-response system may then be what "this product" is, i.e., what product it is that the user wants to be added to the user's shopping list.

To resolve this issue, the voice-response system may conveniently make use of the audio-watermarking in the media stream. For instance, the voice-response system itself and/or an associated device or system may determine the advertised product name based on the audio-watermarking in the media stream at or around the time when the user spoke the voice command, and the voice-response system may use that determined product name to more particularly determine the user intent of the voice command. If the advertisement was for "XYZ Breakfast Cereal," for example, the voice-response system may thereby learn that product name based on the audio-watermarking in the user's environment at or around the time the user spoke the voice command. The voice-response system may then determine that the user intent of the voice command "add this product to my shopping list" is to "add XYZ Breakfast Cereal to my shopping list." And the voice-response system may accordingly take action to add XYZ Breakfast Cereal to the user's shopping list.

As another example, the present process can take advantage of watermarks that are included in the media content to identify particular actors performing in the media content and/or other descriptive information about the media content production.

For instance, a provider of media content (e.g., television, radio, or podcast programming, movies, etc.) may embed in the media content audio watermarks that expressly or by reference provide information about actors performing in the media content, such as names of the actors. As with the advertisement implementation discussed above, the present process may then optimally take advantage of this actor-watermarking to facilitate processing a user's voice command seeking information about an actor performing in the media content.

By way of example, when a user is watching or listening to a media stream at a point in the media stream where an actor is performing, the user may speak the voice command "Hey Device!—tell me about this actor." A voice-response system may thus receive the user's voice command stating "tell me about this actor" and may perform speech recognition, parsing the user's voice command and determining user intent to request information about "this actor". At issue for the voice-response system in that case may then be who "this actor" is.

To resolve this issue, the voice-response system may likewise conveniently make use of the audio-watermarking in the media stream. For instance the voice-response system itself and/or an associated device or system may obtain the actor name from the audio-watermarking in the media stream at or around the time when the user spoke the voice command, and the voice-response system may use that obtained actor name to determine user intent of the voice command. If the actor was Ernest Borgnine, for example, the voice-response system may thereby learn that that actor name based on audio-watermarking in the user's environment at or round the time the user spoke the voice command. The voice-response system may then determine that the user intent of the voice command "tell me about this actor" is "tell me about Ernest Borgnine." And the voice-response system may accordingly obtain and respond to the user by providing the user with information about Ernest Borgnine, such as the name and performance history of Ernest Borgnine.

Similar processing could be carried out in other contexts. Without limitation, for instance, another example scenario could relate to a museum or tourist attraction where a user may speak a voice command related to an art object or the like.

By way of example, an art museum may include a room presenting a piece of artwork, such as a painting or sculpture, for viewing by museum patrons. Further, the art museum could include an audio output device situated at or near the artwork and configured to output audio that steganographically encodes an identifier of the artwork, namely. Such an audio signal may be inaudible to humans, but its steganographic encoding may be detectable by a device configured to scan for and detect such encoding, such as by a user's mobile phone or the like.

When a user visits such a museum and sees this artwork, the user may speak into the user's phone a voice command such as "Hey Phone! Tell me about this artwork." A voice-response system may thus receive the user's voice command stating "tell me about this artwork" and may perform speech recognition, parsing the user's voice command and determining the user intent to request information about "this artwork". At issue for the voice-response system in this case may then be what "this artwork" is.

To resolve this issue, the voice-response system may similarly make use of the information steganographically encoded in the user's environment. For instance the voice-response system itself and/or an associated device or system may obtain the identifier of the artwork from the steganographically encoded audio emitted by the device at or near the artwork. If the artwork was, say, the Mona Lisa, the voice-response system may thereby learn that artwork identity based on the steganographic encoding in the user's environment. The voice-response system may thus determine that the user intent of the voice command "tell me about this artwork" is "tell me about the Mona Lisa". And the voice-response system may accordingly obtain information about the Mona Lisa and respond to the user with that information.

While the above examples focus on audio-based steganography as a way to convey information that could be used to help process a user's voice command, other forms of steganography could be used as well.

As another example, for instance, a computing system could obtain information from image-based steganography, possibly detecting and extracting data steganographically encoded in an image (e.g., video frame, artwork, etc.) within the user's environment to determine associated information, and using that determined information as a basis to tailor the user's voice command, so as to facilitate responding to the voice command. And as yet another example, a computing system could obtain information from optical-based steganography, possibly detecting and extracting data steganographically encoded in light signals within the user's environment to determine associated information, and using that determined information as a basis to tailor the user's voice command, so as to facilitate responding to the voice command.

Further, note that steganographically encoded information could be used in various ways to help process a user's voice command.

In the above examples, for instance, where the user utters as part of the voice command a genus term such as "this product", "this actor", or "this artwork", the voice-response system may use steganographically encoded information from the user's environment as a basis to determine a species of that genus and to interpret the user's voice command accordingly. For example, the voice-response system could translate the genus "this product" into the species "XYZ Breakfast Cereal" based on audio-watermarking in the user's environment identifying the product being advertised as XYZ Breakfast Cereal. Likewise, the voice-response system could translate the genus "this actor" into the species "Ernest Borgnine" based on audio-watermarking in the user's environment identifying the actor performing in the media content as Ernest Borgnine. And likewise, the voice-response system could translate the genus "this artwork" into the species "Mona Lisa" based on steganographically encoded audio data identifying the artwork as the Mona Lisa.

Alternatively, in a situation where a user speaks a voice command that is ambiguous in some other manner, the voice-response system may use information steganographically encoded in the user's environment as a basis to disambiguate a term in the voice command. For instance, in the breakfast-cereal example, if there is a second breakfast cereal with a name similar to "XYZ Breakfast Cereal," and if the user speaks the voice command "Put XYZ Breakfast Cereal on my shopping list," the voice-response system may conclude that the user's speaking of that product name was ambiguous. At issue in that situation may be which of the two breakfast cereals the user meant. To resolve this issue, the voice-response system may determine from steganographic encoding in the user's environment the product being advertised at or around the time the user spoke that voice command was "XYZ Breakfast Cereal" rather than the other similarly named cereal. And the voice-response system may proceed accordingly to put XYZ Breakfast Cereal on the user's shopping list.

FIG. 1 is a simplified block diagram illustrating how steganographic information in a user's environment could be used as basis to facilitate processing of a voice command spoken by the user. Without limitation, this example addresses use of information conveyed through audio-watermarking. It should be understood that other forms of steganography could be used as well as noted above, and that other variations are possible. Further, it should be understood that operations described herein as being carried out by a computing system or the like could be carried out by one or more computer processors executing associated program instructions, among other possibilities.

FIG. 1 depicts an example computing system 100 (i) receiving and processing a voice command spoken by a user, (ii) extracting information from audio-watermarking encoded in the user's environment, and (iii) using the information extracted from the audio-watermarking in the user's environment as a basis to facilitate processing and responding to the user's voice command.

In particular, the figure shows the computing system 100 receiving from a user 102 a voice command 104 spoken by the user. Further, the figure shows the computing system 100 receiving audio 106 emitted from an object 108 in the user's environment (e.g., from a television or other media-presentation device, among other possibilities), the audio including watermarking 110 that expressly or by reference provides context information 112 that can be used as a basis to process the user's voice command 104. In turn, the figure shows the computing system 100 extracting the information 112 provided by watermarking 110 in the received audio, using the extracted information 112 as a basis for processing the user's voice command 104, and then taking an action 114 based on that processing of the voice command 104.

Figure 2:
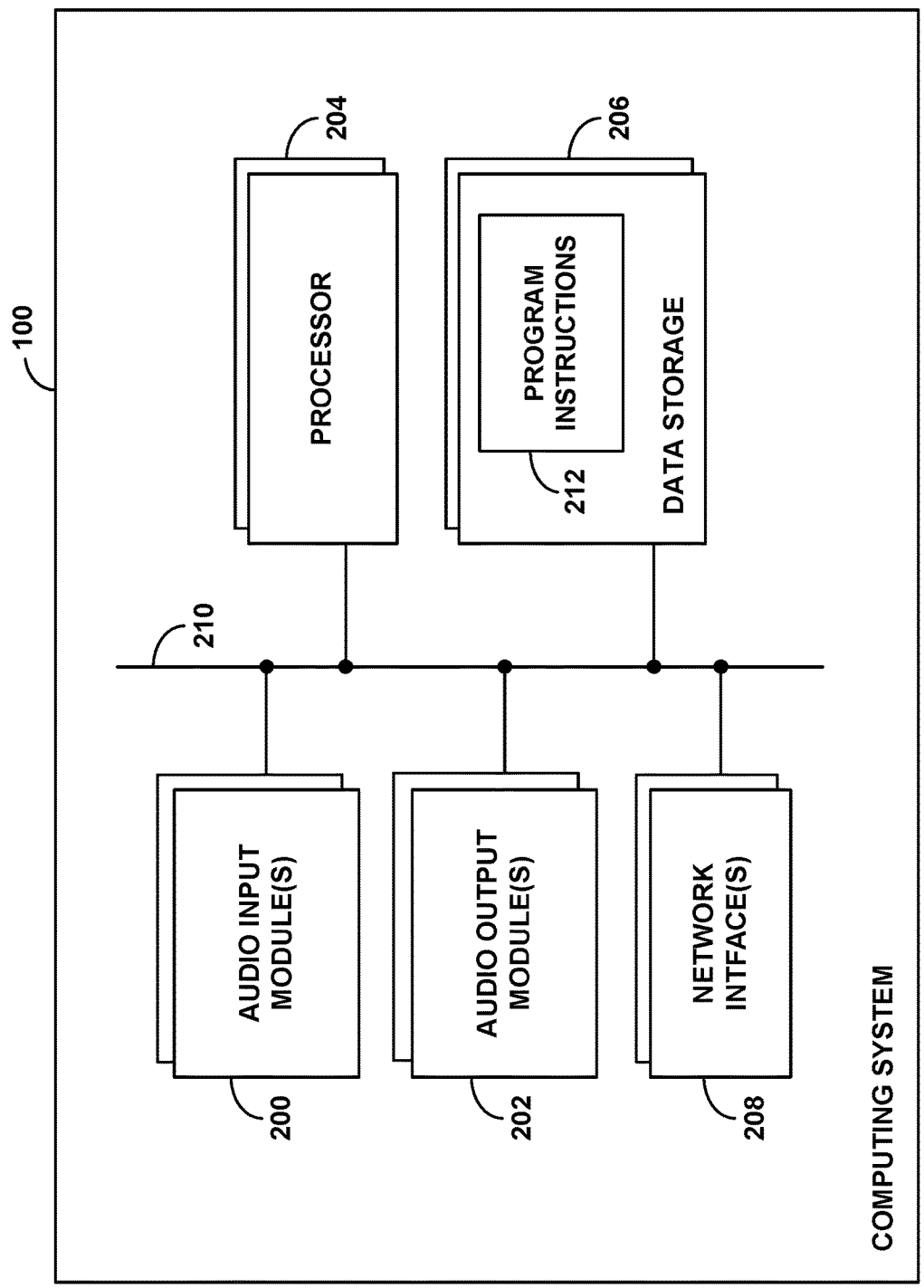
FIG. 2 is a simplified block diagram depicting components of an example computing system.

FIG. 2 is next a simplified block diagram depicting some of the components that could be included in an example of such a computing system 100 to facilitate these operations. As shown in FIG. 2, the example computing system 100 could include one or more audio-input modules 200, one or more audio output modules 202, one or more processors 204, one or more non-transitory data storage units 206, and one or more network interfaces 208, any or all of which may be interconnected together by one or more networks, system busses, and/or other connection mechanisms 210, among other possibilities.

The one or more audio-input modules 200 may comprise one or more microphones and/or other audio input mechanisms configured to receive acoustic audio from the user's environment and to provide associated one or more associated audio feeds for processing by the computing system 100. The one or more audio-output modules 202 may comprise one or more sound speakers and/or other audio output mechanisms configured to output audio, such as voice response audio, to the user.

The one or more processors 204 may comprise one or more general purpose processing units (e.g., microprocessors) and/or one or more specialized processing units (e.g., digital signal processors, dedicated voice processors, dedicated watermark processors, etc.) The one or more non-transitory data storage units 206 may then comprise one or more volatile and/or non-volatile storage components (e.g., flash, optical, magnetic, ROM, RAM, EPROM, EEPROM, etc.), which may be integrated in whole or in part with the one or more processors 204. As further shown, the one or more non-transitory data storage units may store program instructions 212, which may be executable by the one or more processors 204 to carry out various computing-system operations described herein.

The one or more network interfaces 208 may comprise one or more interfaces to facilitate wired and/or wireless communication between possibly one or more components of the computing system 100 and/or between the computing system 100 and one or more other entities, such as to facilitate internet communication, among other possibilities.

In practice, the computing system 100 may comprise one or more client-side devices and one or more server-side devices. The one or more client-side devices may be located proximate to the user 102, such as within a room where the user is positioned, and may be configured to interwork with each other and with the one or more server-side devices. Further, the server-side devices may comprises one or more cloud-based computing systems, and may be configured to interwork with each other and with the one or more client-side devices.

Namely, at the client-side, the computing system 100 could include, in the user's environment, one or more devices configured to (i) receive audio defining the user's voice command and also to receive audio that includes the audio watermarking that expressly or by reference provides the information that will be used as a basis to facilitate processing of the user's voice command and (ii) possibly output a voice response to the user.

For instance, the computing system 100 may include a single client-side device having at least one microphone through which to receive both of these instances of audio (the voice command and the audio-watermarked information), being configured to process each instance of received audio and/or to pass representations of the received audio to one or more server-side devices for processing, and having at least one sound speaker for providing a voice response to the user. Examples of this single device could include, without limitation, the various voice-capable devices noted above.

Such a device may operate generally to receive a user's voice command and to process the voice command so as to take responsive action, and/or to pass a representation of the voice command along to a server for processing and to facilitate responsive action. Further, the device may additionally operate like the monitoring device discussed above to monitor environmental audio for the presence of an audio watermark, either generally or possibly in response to the device receiving a user's voice command (e.g., with the device's receipt of the voice command functioning as a trigger for the device then start monitoring environment audio for the presence of the audio watermark). Further, the device may operate, upon detecting such an audio watermark, to extract data from the watermark and use the extracted data as a basis to process the received voice command so as to take responsive action, and/or to pass the extracted data along to a server, possibly the same server, for use by the server as a basis to process the received voice command and to facilitate taking responsive action. In addition, the device may operate to generate or receive from the server a response (e.g., an audio response) to the user's voice command and to output the response to the user.

Alternatively, the computing system 100 could include multiple separate client-side devices in the user's environment, such as a first device for receiving and processing the user's voice command and possibly providing a response to the user, and a separate, second device for detecting and decoding an audio watermark in the environment so as to facilitate using information determined from the audio watermark as a basis for processing the user's voice command.

For instance, a first device may be a voice-capable device such as one of those noted above, which may operate to receive the user's voice command and to process the voice command and/or pass a representation of the voice command along to a server for processing, to facilitate responsive action. Further, a second device may be a watermark receiver/decoder such as the monitoring device discussed above, which may be provided otherwise to facilitate audience-measurement, and which may operate to monitor environmental audio for the presence of an audio watermark representing information that could be used as a basis to facilitate processing of the user's voice command, so as to facilitate responsive action.

In this implementation, when the second device detects such a watermark in audio in the user's environment, the second device may determine the information represented by the watermark. The second device may then pass that determined information to the first device, to enable the first device, alone or through interworking with one or more server devices, to process the user's voice command based on the information, so as to facilitate responsive action. Alternatively, the second device may pass that information along to a network server, to enable the network server, alone or through interworking with one or more other network servers and/or other devices, to process the user's voice command based on the information, to likewise facilitate responsive action. Still alternatively, when the first device receives the user's voice command, the first device may pass a representation of the voice command to the second device, to enable the second device, alone and/or through interworking with one or more network servers, to process the voice command based on watermarked information extracted by the second device, again to facilitate responsive action.

At the server side, the computing system 100 may similarly include one or more devices, such as one or more network servers, which could be configured to interwork with the one or more client-side devices so as to facilitate processing of the user's voice command based on information extracted from audio watermarking in the user's environment, and taking of responsive action.

For instance, the computing system 100 may include a single server-side device configured to receive from one or more client-side devices both a representation of the user's voice command and information determined based on audio watermarking in the user's environment. This server-side device may operate to process the user's voice command based on the information extracted from the watermarking in the user's environment, and to take action based on the processing of the voice command, including possibly providing a voice response to one of the client-side devices for output to the user.

Alternatively, the computing system 100 may include separate server-side devices (e.g., devices or systems). As with the client-side, these server-side devices may include a first device for receiving and processing the user's voice command and possibly providing an audio response to the user, and a separate, second device for handling the audio watermark data.

For instance, a first server-side device may be a voice processing system configured to receive from a client-side device a representation of a voice command spoken by a user, to engage in speech recognition such as parsing of the voice command and determining an associated user intent, and to carry out or cause to be carried out associated action in response, possibly including providing a voice response for a client-side device to play out to the user. The second server-side device may then be a system that handles watermark processing. Without limitation, an example of such a system may be an audience-measurement server operable in the arrangement discussed above, which could receive reports of watermarked media-content identification and generate audience measurement statistics. Such a system, and/or another server-side device, may be configured to receive from a client-side device a representation of data that the client-side device extracted from an audio watermark in the user's environment, possibly to map that data to associated information, and to provide the information to the first server-side device for use as a basis to facilitate processing of the user's voice command, so as to facilitate responsive action. Other examples are possible as well.

In making use of watermarking or other steganographically encoded information in the user's environment as a basis to process the user's voice command, the computing system 100 may work to correlate the timing of the voice command and the steganographically encoded information.

For instance, as noted above, the computing system 100 may monitor for the presence of the steganographic information in response to receiving the voice command. In that implementation, the computing system 100 may make use of the steganographically encoded information further responsive to the computing system 100 detecting and extracting the steganographically encoded information soon enough after receiving the voice command, such as within a time period that is no longer that a predefined threshold short duration deemed to correlate the information with the voice command.

Alternatively, the computing system 100 may regularly monitor for receipt of both audio representing the voice command and audio representing the steganographic information that could be used as a basis to facilitate processing of the voice command, and the computing system 100 may use timestamps of each as a basis to correlate them. For instance, when the computing system 100 receives the user's voice command, the computing system 100 may record the voice command with a first timestamp indicating time of the computing system's receipt of the voice command. Further, when the computing system 100 receives the steganographically encoded information, the computing system 100 may record that information with a second timestamp indicating time of the computing system's receipt of the information. The computing system may then compare the first and second timestamps to determine whether the voice command and steganographic information were received close enough in time to each other, e.g., within a predefined threshold short time, as a basis for the computing system 100 deciding to use the steganographic information as a basis to process the voice command.

Figure 3:
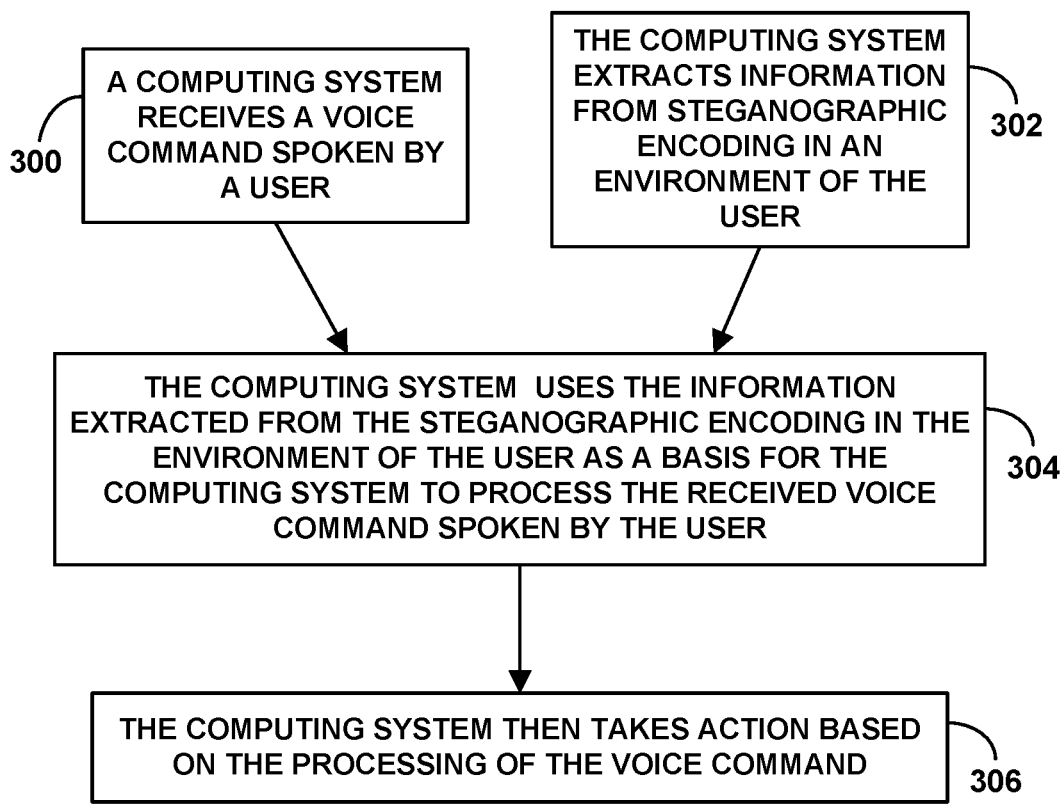
FIG. 3 is flow chart illustrating a method that could be carried out in accordance with the disclosure.

FIG. 3 is next a flow chart illustrating a method that could be carried out in accordance with the present disclosure, to facilitate processing of a voice command based on steganographically encoded information. As shown in FIG. 3, at block 300, a computing system receives a voice command spoken by a user, and at block 302, the computing system extracts information from steganographic encoding in an environment of the user. At block 304, the computing system then uses the information extracted from the steganographic encoding in the environment of the user as a basis for the computing system to process the received voice command spoken by the user. And at block 306, the computing system then takes action based on the processing of the voice command.

FIG. 3 illustrates the operations of blocks 300 and 302 being carried out in parallel. In an example implementation, that may be the case. Alternatively, blocks 300 and 302 may be carried in sequence, such as either in response to the other for instance.

In line with the discussion above, the information that the computing system extracts from the steganographic encoding in the environment of the user could include information encoded in (e.g., represented directly or indirectly by) audio watermarking in media content playing in the environment of the user. Further, as discussed above, the voice command could include a request related to a subject matter of the media content but may not identify that subject matter, and the information extracted from the steganographic encoding in the environment of the user may identify the subject matter, so as to facilitate processing of the voice command related to that subject matter. In addition, as discussed above, examples of subject matter of the media content could include a product or service advertised in the media content and an actor performing in the media content.

As further discussed above, the steganographic encoding in the environment of the user could use any of various types of steganography, examples of which include audio steganography, image steganography, and optical steganography.

In addition, as discussed above, the act of using the information extracted from the steganographic encoding in the environment of the user as a basis for the processing of the received voice command spoken by the user could take various forms, examples of which include using the information as a basis to translate a genus in the voice command to a species of the genus, and otherwise using the information as a basis to disambiguate a term in the voice command.

Further, as discussed above, the act of using the information extracted from the steganographic encoding in the environment of the user as a basis for the processing of the received voice command spoken by the user could be contingent on the information being extracted from the steganographic encoding close enough in time to the voice command being received. For instance, the computing system could require such closeness in time as a condition for so using the extracted information.

Yet further, as discussed above, the act of taking action based on the processing of the voice command could comprise the computing system itself taking action and/or the computing system causing one or more other devices or systems to take action. Further, the action could take various forms, examples of which include engaging in a commercial transaction (e.g., adding an item to a shopping list of the user and/or engaging in purchase of the item), and providing information to the user (e.g., providing the user with information about an item.

As additionally noted above, such a method could be carried out by a computing system such as that described above. Further, the present disclosure also contemplates at least one non-transitory computer readable medium that is encoded with, stores, or otherwise embodies program instructions executable by at least one processor to carry out various operations as described above.

Exemplary embodiments have been described above. Those skilled in the art will understand, however, that changes and modifications may be made to these embodiments without departing from the true scope and spirit of the invention.

What is claimed is:

1. A method for voice-command processing, the method including:
   receiving into a computing system a voice command spoken by a user;
   extracting by the computing system information from steganographic encoding in an environment of the user;
   using by the computing system the information extracted from the steganographic encoding in the environment of the user as a basis for processing by the computing system the received voice command spoken by the user, wherein the using the information extracted from the steganographic encoding in the environment of the user as a basis for the processing of the received voice command spoken by the user is contingent on the information being extracted from the steganographic encoding close enough in time to the voice command being received and includes comparing a timestamp of the steganographic encoding with a timestamp of the voice command as a basis to determine whether the information being extracted from the steganographic encoding is close enough in time to the voice command being received; and
   taking action by the computing system based on the processing of the voice command.

2. The method of claim 1, wherein the information extracted from the steganographic encoding in the environment of the user comprises information encoded in audio watermarking in media content playing in the environment of the user.

3. The method of claim 2, wherein the voice command comprises a request related to a subject matter of the media content and does not identify the subject matter, and wherein the information extracted from the steganographic encoding in the environment of the user identifies the subject matter.

4. The method of claim 3, wherein the subject matter of the media content comprises a product or service advertised in the media content.

5. The method of claim 3, wherein the subject matter of the media content comprises an actor performing in the media content.

6. The method of claim 1, wherein the steganographic encoding uses a type of steganography selected from the group consisting of audio steganography, image steganography, and optical steganography.

7. The method of claim 1, wherein using the information extracted from the steganographic encoding in the environment of the user as a basis for the processing of the received voice command spoken by the user comprises using the information as a basis to translate a genus in the voice command to a species of the genus.

8. The method of claim 1, wherein using the information extracted from the steganographic encoding in the environment of the user as a basis for the processing of the received voice command spoken by the user comprises using the information as a basis to disambiguate a term in the voice command.

9. The method of claim 1, wherein the taking action comprises an operation selected from the group consisting of (i) engaging in a commercial transaction and (ii) providing information to the user.

10. A computing system comprising:
    at least one processor;
    non-transitory data storage; and
    program instructions stored in the non-transitory data storage and executable by the at least one processor to carry out operations for voice-command processing, the operations including:
    receiving a voice command spoken by a user,
    extracting information from steganographic encoding in an environment of the user,
    using the information extracted from the steganographic encoding in the environment of the user as a basis for processing the received voice command spoken by the user, wherein the using the information extracted from the steganographic encoding in the environment of the user as a basis for the processing of the received voice command spoken by the user is contingent on the information being extracted from the steganographic encoding close enough in time to the voice command being received and includes comparing a timestamp of the steganographic encoding with a timestamp of the voice command as a basis to determine whether the information being extracted from the steganographic encoding is close enough in time to the voice command being received, and
    taking action based on the processing of the voice command.

11. The computing system of claim 10, wherein the information extracted from the steganographic encoding in the environment of the user comprises information encoded in audio watermarking in media content playing in the environment of the user.

12. The computing system of claim 11, wherein the voice command comprises a request related to a subject matter of the media content and does not identify the subject matter, and wherein the information extracted from the steganographic encoding in the environment of the user identifies the subject matter.

13. The computing system of claim 12, wherein the subject matter of the media content comprises subject matter selected from the group consisting of a product or service advertised in the media content and an actor performing in the media content.

14. The computing system of claim 10, wherein the steganographic encoding uses a type of steganography selected from the group consisting of audio steganography, image steganography, and optical steganography.

15. The computing system of claim 10, wherein using the information extracted from the steganographic encoding in the environment of the user as a basis for the processing of the received voice command spoken by the user comprises using the information as a basis to translate a genus in the voice command to a species of the genus.

16. The computing system of claim 10, wherein using the information extracted from the steganographic encoding in the environment of the user as a basis for the processing of the received voice command spoken by the user comprises using the information as a basis to disambiguate a term in the voice command.

17. At least one non-transitory computer-readable medium embodying program instructions executable by at least one processor to carry out operations for voice-command processing, the operations including:
 receiving a voice command spoken by a user,
 extracting information from steganographic encoding in an environment of the user,
 using the information extracted from the steganographic encoding in the environment of the user as a basis for processing the received voice command spoken by the user, wherein the using the information extracted from the steganographic encoding in the environment of the user as a basis for the processing of the received voice command spoken by the user is contingent on the information being extracted from the steganographic encoding close enough in time to the voice command being received and includes comparing a timestamp of the steganographic encoding with a timestamp of the voice command as a basis to determine whether the information being extracted from the steganographic encoding is close enough in time to the voice command being received, and
 taking action based on the processing of the voice command.

18. The at least one non-transitory computer-readable medium of claim 17,
 wherein the information extracted from the steganographic encoding in the environment of the user comprises information encoded in audio watermarking in media content playing in the environment of the user,
 wherein the voice command comprises a request related to a subject matter of the media content and does not identify the subject matter, and wherein the information extracted from the steganographic encoding in the environment of the user identifies the subject matter.

* * * * *